US007178757B1

(12) United States Patent
Breese et al.

(10) Patent No.: US 7,178,757 B1
(45) Date of Patent: Feb. 20, 2007

(54) MOTORCYCLE RIDER AUTOGYRO

(76) Inventors: Charlene Breese, P.O. Box 5140, Santa Maria, CA (US) 93456; Vance Breese, P.O. Box 5140, Santa Maria, CA (US) 93456

( * ) Notice: Subject to any disclaimer, the term of this patent is extended or adjusted under 35 U.S.C. 154(b) by 144 days.

(21) Appl. No.: 10/906,202

(22) Filed: Feb. 8, 2005

Related U.S. Application Data

(60) Provisional application No. 60/543,238, filed on Feb. 10, 2004.

(51) Int. Cl.
*B64C 27/22* (2006.01)
*B64C 27/00* (2006.01)

(52) U.S. Cl. .................. 244/8; 244/17.11; 244/99.2; 244/7 A; 244/17.19; 244/17.25; 244/56; 244/221

(58) Field of Classification Search ............... 244/6, 244/7 A, 8, 17.11, 17.19, 17.25, 17.27, 23 B, 244/56, 99.2, 99.3, 220, 221, 234
See application file for complete search history.

(56) References Cited

U.S. PATENT DOCUMENTS

| 897,738 | A | | 9/1908 | Gordon | |
|---|---|---|---|---|---|
| 1,061,870 | A | | 5/1913 | Rodriguez | |
| 1,189,680 | A | | 7/1916 | Gardner | |
| 1,379,522 | A | | 5/1921 | Bruner | |
| 1,578,740 | A | | 3/1925 | Kurelic | |
| 1,590,497 | A | | 6/1926 | de la Cierva | |
| 1,777,941 | A | | 10/1930 | Szakacs | |
| 1,980,999 | A | * | 11/1934 | Larsen | 244/17.27 |
| 2,037,745 | A | * | 4/1936 | Vaughn | 244/17.19 |
| D140,875 | S | * | 4/1945 | Gumb | D12/4 |
| 2,954,186 | A | | 9/1960 | Bilbrey | |
| 3,149,802 | A | | 9/1964 | Wigal | |
| 4,114,843 | A | * | 9/1978 | Robinson | 244/229 |
| 4,134,560 | A | * | 1/1979 | Messerschmidt | 244/234 |
| 4,653,705 | A | | 3/1987 | Bensen | |
| 4,657,207 | A | * | 4/1987 | Poling | 244/21 |
| 5,078,335 | A | * | 1/1992 | David | 244/2 |
| 5,098,033 | A | | 3/1992 | Haseloh et al. | |
| 5,190,243 | A | * | 3/1993 | Guimbal | 244/17.25 |
| 5,301,900 | A | * | 4/1994 | Groen et al. | 244/17.25 |
| 5,377,775 | A | | 1/1995 | Rush | |
| 5,527,004 | A | * | 6/1996 | Haggerty et al. | 244/229 |
| 5,544,844 | A | * | 8/1996 | Groen et al. | 244/8 |
| 6,182,923 | B1 | * | 2/2001 | Weinhart | 244/17.25 |
| 6,877,690 | B1 | * | 4/2005 | Bragg | 244/2 |
| 7,037,072 | B2 | * | 5/2006 | Carson | 416/1 |

* cited by examiner

*Primary Examiner*—Teri Pham Luu
*Assistant Examiner*—Joshua Michener
(74) *Attorney, Agent, or Firm*—William Keyworth; Bill & Mary Lou Inc.

(57) ABSTRACT

An autogyro, or aircraft with a rotating wing, has an airframe providing a motorcycle-like configuration for the rider. The motorcycle-like straddle-type seat locates the rider in front of the rotating wing, behind a teardrop shaped simulated fuel tank, and above the motorcycle engine used for turning the front-mounted propeller. A motorcycle-like handlebar controls the aircraft, including the adjustment for the rotating wing axis of rotation with respect to the aircraft and the engine throttle. Additional controls for operating the aircraft on the ground, such as wheel brakes and the steering, are also controlled from the handlebar.

8 Claims, 10 Drawing Sheets

MOTORCYCLE RIDER AUTOGYRO

CROSS-REFERENCE TO RELATED APPLICATIONS

This application claims priority from U.S. Provisional Patent Application 60/543,238, "Motorcycle Rider Autogyro" filed on Feb. 10, 2004, which is incorporated herein by reference.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

1. Field of the Invention

This invention relates to an autogyro aircraft with accommodations providing a motorcycle rider transportation experience.

2. Description of Related Art

Autogyro aircraft are known in the art. An autogyro aircraft derives lift from an un-powered, freely-rotating rotating wing or plurality of rotor blades. The energy to rotate the rotating wing results from the forward movement of the aircraft in response to a thrusting engine, such as a motor driven propeller.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines with attached propellers may be tractor-mounted on the front of an autogyro or pusher-mounted on the rear of the autogyro. Typically an autogyro will cruise near 100 miles per hour (mph), but much slower speeds, down to 20 mph are safely accommodated, making them useful for touring and sightseeing.

Airflow passing the rotating wing, alternately called rotor blades or rotor, which are tilted upwardly toward the front of the autogyro, provides the driving force to rotate the wing. The Bernoulli effect of the airflow moving over the rotating wing surface creates lift. The autogyro rotor will provide lift even if the engine fails, allowing the aircraft to slowly descend as in a normal landing.

U.S. Pat. No. 1,590,497 issued to Juan de la Cierva, of Madrid, Spain, illustrated perhaps the earliest embodiment of an autogyro. He is credited with inventing the autogyro. Even though the principal focus for rotating wing flight shifted to helicopters, there has been a small but continuing interest in autogyro craft, particularly for one or two person personal aircraft. A number of improvements to aid in performance have been developed. Autogyros available today are primarily personal aircraft. That is they are small, light, and accommodate one, or at most 2, people. The evolution of the operator accommodation and operating controls for the craft have, however, followed winged aircraft practice, including practices for ultra-light aircraft. Examples are U.S. Pat. No. 2,954,186 (Bilbrey) which discloses a personal aircraft with a bench seat and a single lever control, U.S. Pat. No. 3,149,802 (Wigal) discloses an autogyro with an enclosed cockpit and tilting rotor mast and propeller engine mounting to provide shorter take-off distances, U.S. Pat. No. 4,653,705 (Bensen) discloses operator accommodations similar to Bilbrey with an automatic transmission to coordinate propeller speed with rotor speed, U.S. Pat. No. 5,098,033 (Haseloh et al) discloses an autogyro with an enclosed cockpit and an adjustable angle on the rotor mast to assist in control, U.S. Pat. No. 5,544,844 (Groen et al) discloses another closed cockpit with a bench seat and a stick control system and retractable landing gear. This patent also describes one form of rotor blade pre-rotator that is used to start the rotor blades turning prior to takeoff.

There is a sizable segment of adventurous people who enjoy motorcycle riding for the rider experience. A personal aircraft with such an accommodation will appeal to people in this segment. One patent, U.S. Pat. No. 1,578,740 (Kurelic) proposed a motorcycle-like accommodation for a hydroplane that was also capable of the wheels being powered by the operator pedaling, an un-motorcycle-like activity. The patent claims a combination motorcycle and collapsible winged aeroplane with the wheels also driven by the engine like a motor vehicle. Another patent, U.S. Pat. No. 5,377,775 (Rush) is described as a hovercraft motorcycle but the operator accommodation is similar to a typical automobile. Neither of these provides a true aircraft with an experience like motorcycle riding. In operating a motorcycle, the rider straddles the seat facing the windshield, or open air if there is no windshield, with the handlebar ends gripped by the hands and the upper legs straddling the simulated fuel tank and the lower legs straddling the engine. In this position the rider has control over the machine. Turns are navigated by a slight turn of the handlebars and leaning the body to the side the machine is turning. The machine leans in the direction of the turn as the rider experiences the thrill of interactive control with a small vehicle moving at high speed.

The prior art suffers from a lack of familiar operator accommodation to make personal aircraft easier to learn to fly, less intimidating to the person who is not a fixed-wing aircraft pilot, and more fun to operate. The prior art also suffers from a fixed-wing aircraft bias in the styling of the vehicles. A rotating wing personal aircraft with a motorcycle rider operator accommodation and a control system that is familiar to motorcycle riders is needed to take the motorcycle interactive experience to the air.

SUMMARY OF THE INVENTION

The present invention is an autogyro aircraft with a motorcycle rider accommodation. A lightweight tubular frame supports front and rear wheels that are used to taxi the craft and for take-off and landing. The front wheel(s) are steered by turning a handlebar. Brakes are provided for stopping the aircraft on the ground. The front of the frame supports the propeller that provides forward motion to the aircraft. The propeller is connected to a motorcycle internal combustion engine located behind the propeller by a propeller drive assembly. The propeller provides forward propulsion of the aircraft. The drive assembly reduces the speed of the propeller as compared to the speed of the engine by using different size pulleys on a drive belt or chain and a right-angle reduction gear connected to the propeller drive shaft.

Above the engine is a teardrop shaped simulated fuel tank containing an instrument panel with the large end of the teardrop facing forward, towards the propeller. The simulated fuel tank is configured to provide room for the aircraft instrumentation. Directly behind the simulated fuel tank is a straddle type seat common to motorcycles. Behind the seat is the tower for the rotor blade assembly and behind that, a rudder and horizontal stabilizer assembly. The rotor blade assembly rotates freely on an axis at an angle to the perpendicular to the aircraft front-to-rear axis. Forward of the simulated fuel tank is the handlebar control assembly with a handle bar connected to a control column in the center so turning the handle bar provides a turning motion to the control column.

The arrangement places the occupant of the seat, the rider, straddling the seat behind the simulated fuel tank so the seat occupant's legs straddle the seat and frame, placing the simulated fuel tank in between the occupant's upper legs and the engine between the occupant's lower legs, as on a motorcycle.

The rotor blade axis of rotation is at an angle from the aircraft vertical towards the rear of the frame to enhance rotation when moving forward. This axis of rotation is adjustable in both the front-to-rear direction and the side-to-side direction.

The handlebar control assembly has a handlebar either curved toward the seat, or straight, with ends at each side of the aircraft. The handlebar central area is attached to the control column. A rider holding the handlebar ends may turn the bar causing the control column to turn. The turning motion of the control column rotation adjusts the angle of the front wheel or wheels with respect to the frame front-to-rear axis. This permits steering the aircraft on the ground. The control column is arranged so the control column may be tilted a limited amount in the front-to-rear and side-to-side directions. A rotor angle control linkage translates this tilting motion of the handlebar and control column to the rotor head to adjust the angle of the rotor blade with respect to the aircraft pitch and roll axes; that is the front-to-rear and side-to-side directions, by moving the control column in these directions. This permits steering the aircraft and controlling the aircraft's speed in the air.

Objects and Advantages

One object of this invention is to increase the enjoyment of flying a personal autogyro aircraft.

A second object of this invention is to provide a motorcycle rider-like interface that requires less training for non-pilots than fixed-wing airplane-like interfaces.

A third object of this invention is to provide a rotor angle control that is lightweight by providing control motion in two directions using a single control mechanism.

A fourth object of this invention is to provide a control system for an autogyro aircraft that is simple to use.

A fifth object of this invention is to provide an autogyro aircraft which is affordable by using parts which are readily available from many motorcycle or automotive parts supply sources.

A sixth object of this invention is to provide an autogyro aircraft that has familiar and desirable styling features.

BRIEF DESCRIPTION OF THE SEVERAL VIEWS OF THE DRAWINGS

A more complete understanding of the present invention can be obtained by considering the detailed description in conjunction with the accompanying drawings, in which.

REFERENCE NUMERALS IN DRAWINGS

Figure 1:
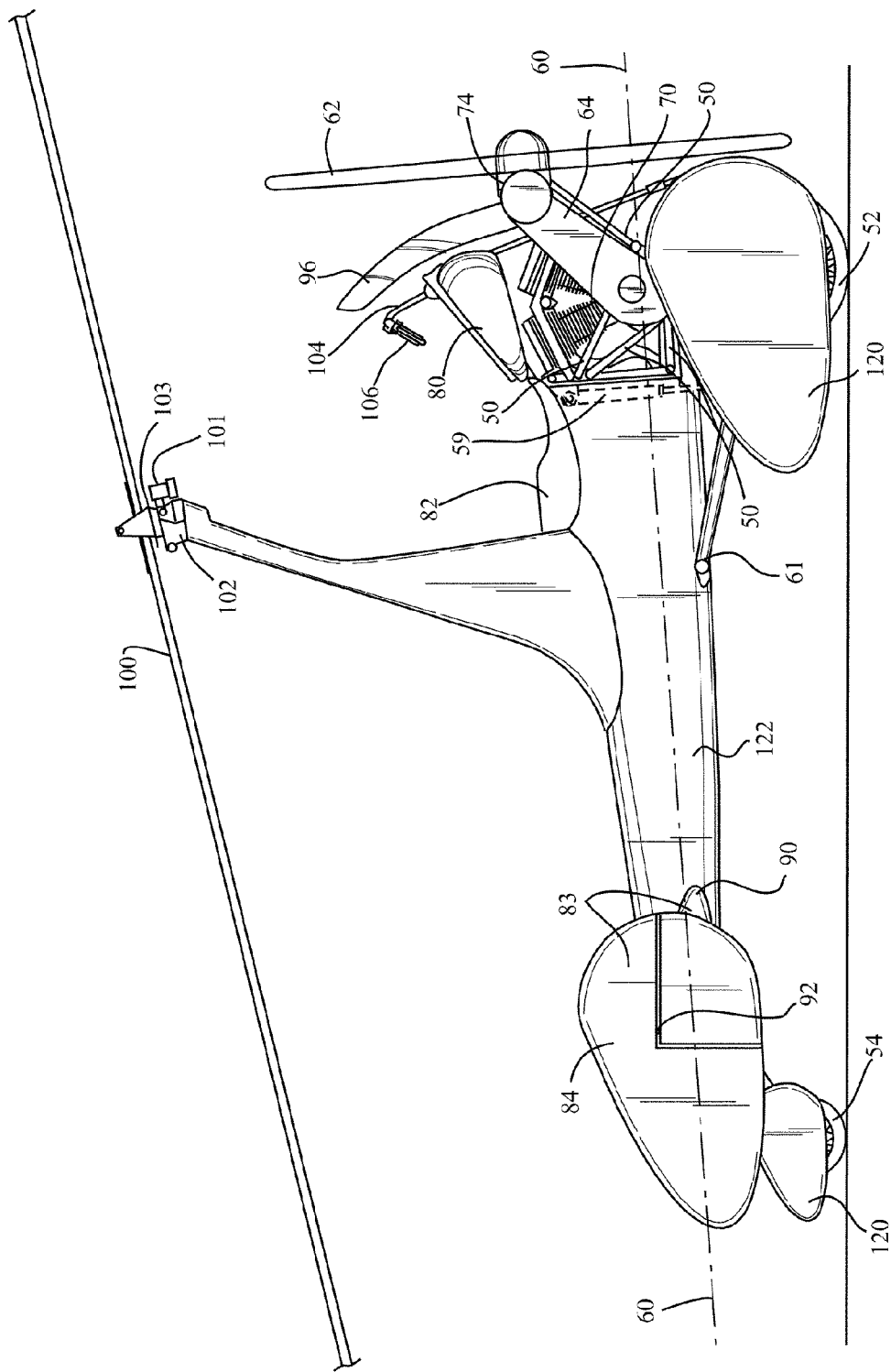
FIG. 1 is a right side view of the motorcycle rider autogyro.

These reference numbers are used in the drawings to refer to areas or features of the invention.

40 Axle Assembly
42 Axle Tie Rod
50 Frame
52 Front Wheel
54 Rear Wheel
55 Tail Wheel
56 Brake
58 Suspension Torsion Bar
59 Suspension Spring-controlled Shock Absorber
60 Frame Front-to-rear Axis
61 Axle Suspension Frame and Pivot Bearings
62 Propeller
64 Propeller Drive System
66 Propeller Drive System Propeller Drive Shaft
68 Propeller Drive System Drive Belt Guard
70 Engine
72 Propeller Drive System Drive Belt
73 Propeller Drive System Drive Belt Pulley
74 Propeller Drive System Right-angle Gear Transmission
78 Bearing
80 Teardrop-shaped Simulated Fuel Tank
82 Straddle-type Seat
83 Rudder and Horizontal Stabilizer Assembly
84 Rudder and Horizontal Stabilizer Assembly Rudder Surface
90 Rudder and Horizontal Stabilizer Assembly Horizontal Stabilizer Surface
92 Rudder and Horizontal Stabilizer Assembly Rudder Hinge
96 Windshield
100 Rotating Wing or Rotor Blade Assembly
101 Rotor Pre-rotation Device
102 Rotor Head
103 Pre-rotation Device Drive Mechanism
104 Control Assembly
106 Handlebar
108 Control Column
110 Control Column Gimbal Mount
112 Rotor Angle Control Linkage Shaft
114 Rotor Angle Control Linkage Ball Joint
116 Rotor Angle Control Linkage Spherical Rod Ends
118 Bearing
120 Wheel Fairing
122 Fuselage
124 Foot Rest and Controls

DETAILED DESCRIPTION OF THE INVENTION

Figure 2:
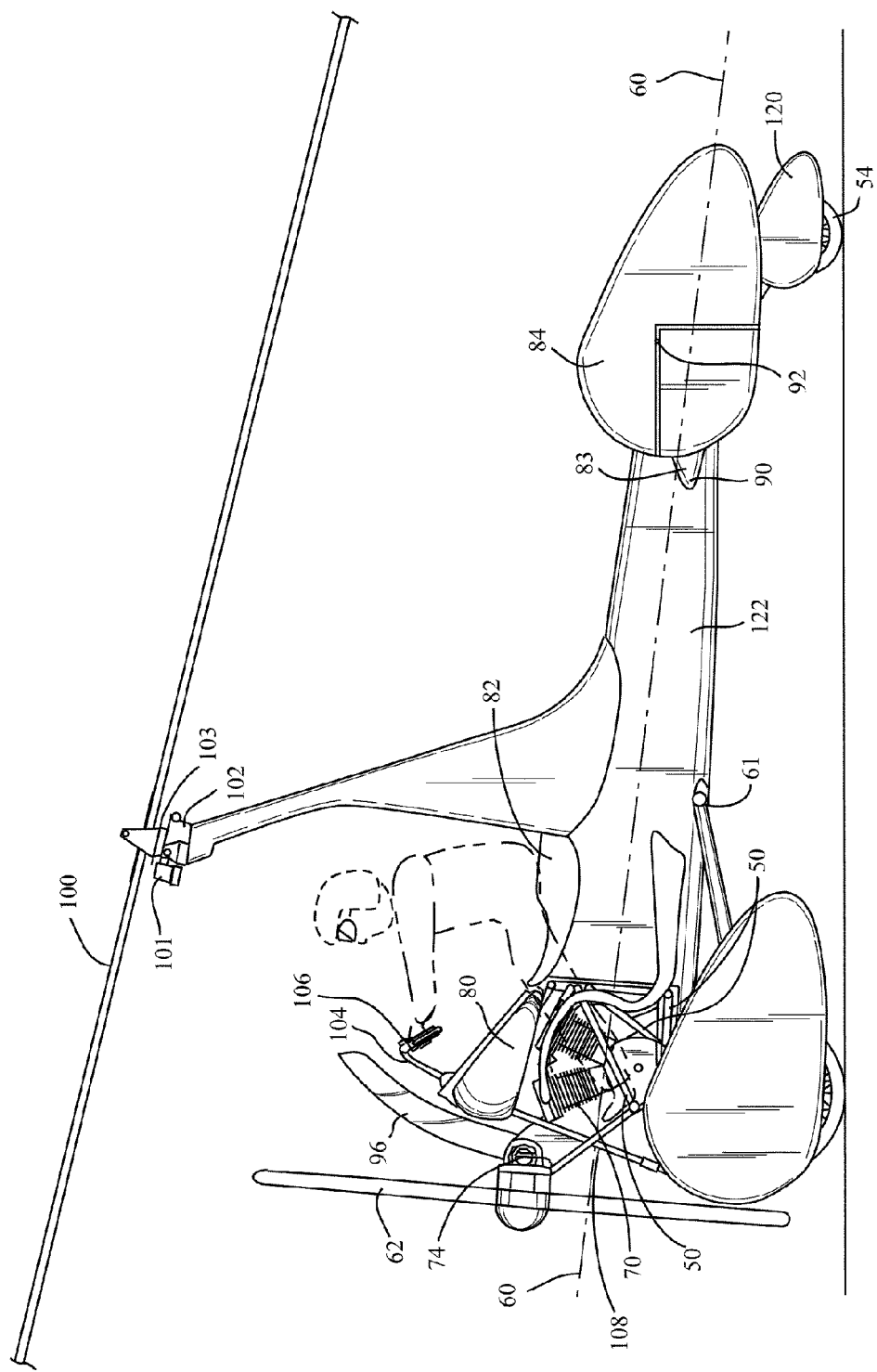
FIG. 2 is a left side view of the motorcycle rider autogyro.

The motorcycle rider autogiro is shown in FIGS. 1 through 4. FIG. 1 is a right side view showing the arrangement of the aircraft. FIG. 2 shows the left side view, FIG. 3 the top view, and FIG. 4 the front view. The straddle-type seat (82) is located on the forward part of the frame (50) behind the simulated fuel tank (80), windshield (96), and propeller (62). The seat is above and slightly behind the engine (70). The rotating wing, also called the rotor blade assembly (100), is supported behind and above the seat. Further behind the seat and rotor blade assembly is the rudder and horizontal stabilizer assembly (83). The frame is supported on the ground on 3 lightweight motorcycle-like spoked wheels with rubber tires, two front (52) and one rear (54), which support the frame, the rider, and all the aircraft components attached to the frame on a ground surface. In FIGS. 1 and 2 the frame front-to-rear axis (60) is shown. This is the axis of normal motion of the aircraft, which is in the forward direction. The V-twin type motorcycle engine (70) is located below the straddle-type seat and simulated fuel tank at the lower portion of the frame.

Figure 6:
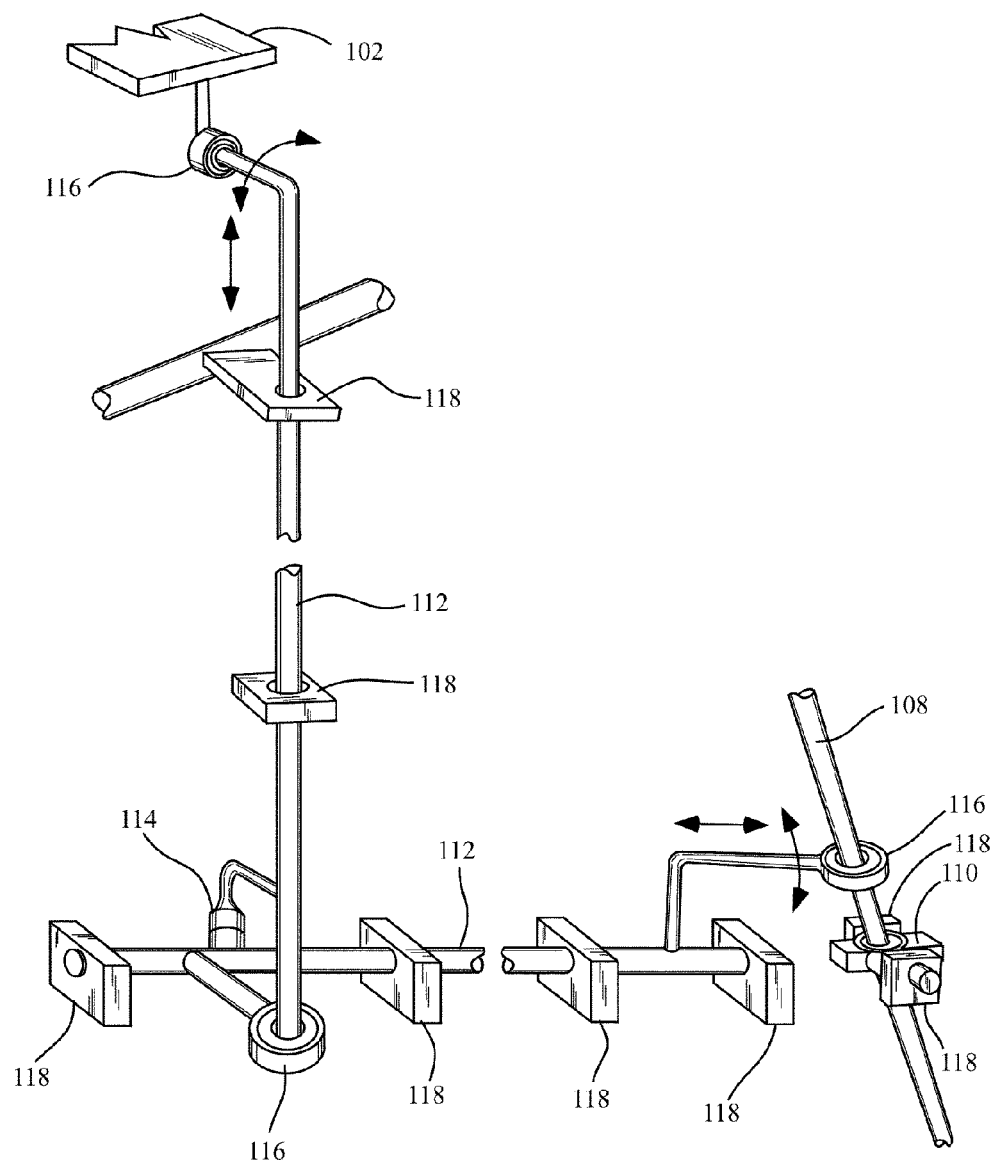
FIG. 6 shows a detail view of the motorcycle rider autogyro rotor control linkage.

The frame is constructed of lightweight metal tubing and provides support and a connection, either welded or using fasteners, for the aircraft components shown in FIGS. 1 and 2. These components include the propeller drive system (64), which supports and rotates the propeller (62), the windshield (96), the control column (108), which steers the front wheel(s) (52), and the handlebar (104). The simulated fuel tank (80), and straddle-type seat (82), shown in FIGS. 1 and 2, connect to frame members that also support the lower portion of the rotor angle control assembly (112), such as shown in FIG. 6.

The front wheels (54) are the aircraft main landing gear, and are connected to an axle assembly (40) that is suspended from the frame by the suspension spring-controlled shock absorber (59), which is internal to the fuselage (122), as shown in FIG. 1, and an axle suspension frame (61) that is free to pivot in bearings on the frame. The shock absorber reduces the shock of irregularities in the ground surface that the aircraft is moving on and also absorbs the shock of landing on the ground after flight. The front wheels also have disc brakes (56) used to slow and stop the aircraft when on the ground. These are controlled by a lever on the handlebar, similar to the control of a motorcycle's brakes. An axle tie rod (42), shown in FIG. 3, turns the wheels in response to turning the control assembly (104) through a common steering gear, which is not shown.

The rudder and horizontal stabilizer assembly (83) is connected to several frame members at the rear end of the frame, some of which also support the rotor assembly (100). The fuselage (122), which is a thin covering of molded composite material or aluminum, hides these frame members from view. These have a similar arrangement to those shown in FIGS. 7–10, but are arranged to allow for supporting the aircraft on the rear wheel (54) near the rudder and horizontal stabilizer assembly (100) when the aircraft is on the ground, and to allow attaching the fuselage (122) parts. The two vertical members of the rudder and horizontal stabilizer assembly, shown in FIGS. 1–4 are the rudders (84). The horizontal stabilizer (90) is the horizontal member, also shown in FIGS. 3 and 4. This assembly has movable rudder surfaces (91) that aid in controlling the yaw of the aircraft in flight, and the direction of the aircraft on takeoff and landing. The horizontal stabilizer aids in steadying pitch oscillations in flight. Control of the rudder surfaces is by cables connected to foot pedal controls that are common and well know to those familiar with aircraft.

The rotor assembly, or rotating wing (100), is shown in FIGS. 1–4. The rotor provides the lift for the aircraft by its rotating motion. It is driven by the air flowing by the blades when the aircraft is moving forward or descending. The connection of the rotor blades to the frame is through a rotor head (102) that contains hinge joints that allow the rotor blade to be angularly adjusted, that is the axis of rotation with respect to the aircraft may be tilted in the front-to-rear direction and the side-to-side direction. The front-to-rear adjustment assists in control of the aircraft pitch, which controls the angle of the rotor with respect to the forward motion of the aircraft in flight. Adjusting the front-to-rear angle also adjusts the aircraft forward velocity by adjusting the drag of the rotor. The side-to-side adjustment controls the roll angle of the rotor, which assists in turning the aircraft in flight. A rotor head with hinge joints is common on autogyro aircraft. A rotor pre-rotation device (101) is provided near the rotor head to turn the rotor prior to take-off of the aircraft. This rotation reduces the distance required for take-off.

The V-twin type motorcycle engine (70) drives the propeller (62). Fuel for the engine is supplied from a tank in the fuselage that is not shown. The propeller location at the front of the aircraft is also called a puller configuration as the air flow is from the front-mounted propeller to the rear of the aircraft.

Figure 3:
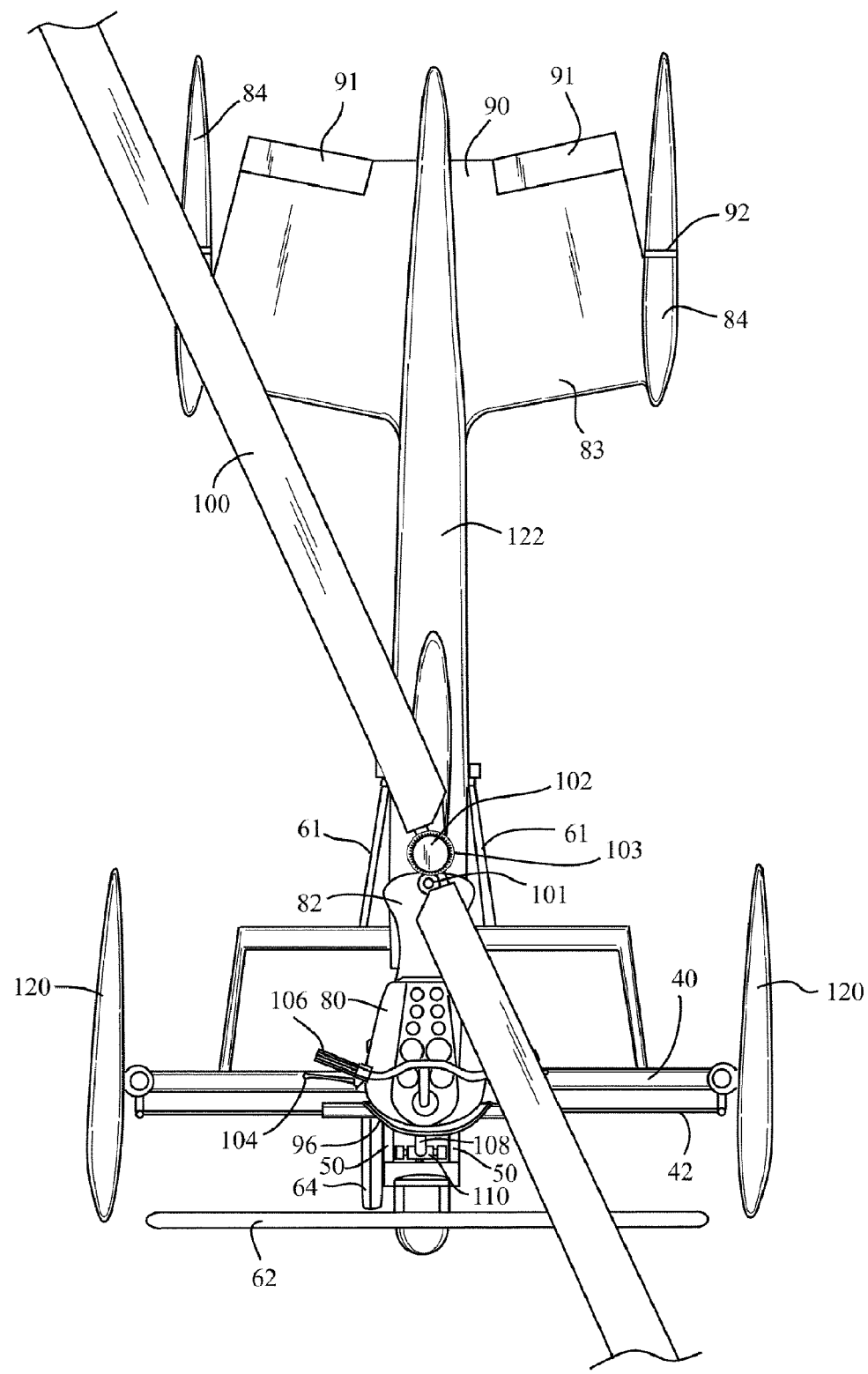
FIG. 3 is a top view of the motorcycle rider autogyro.
Figure 4:
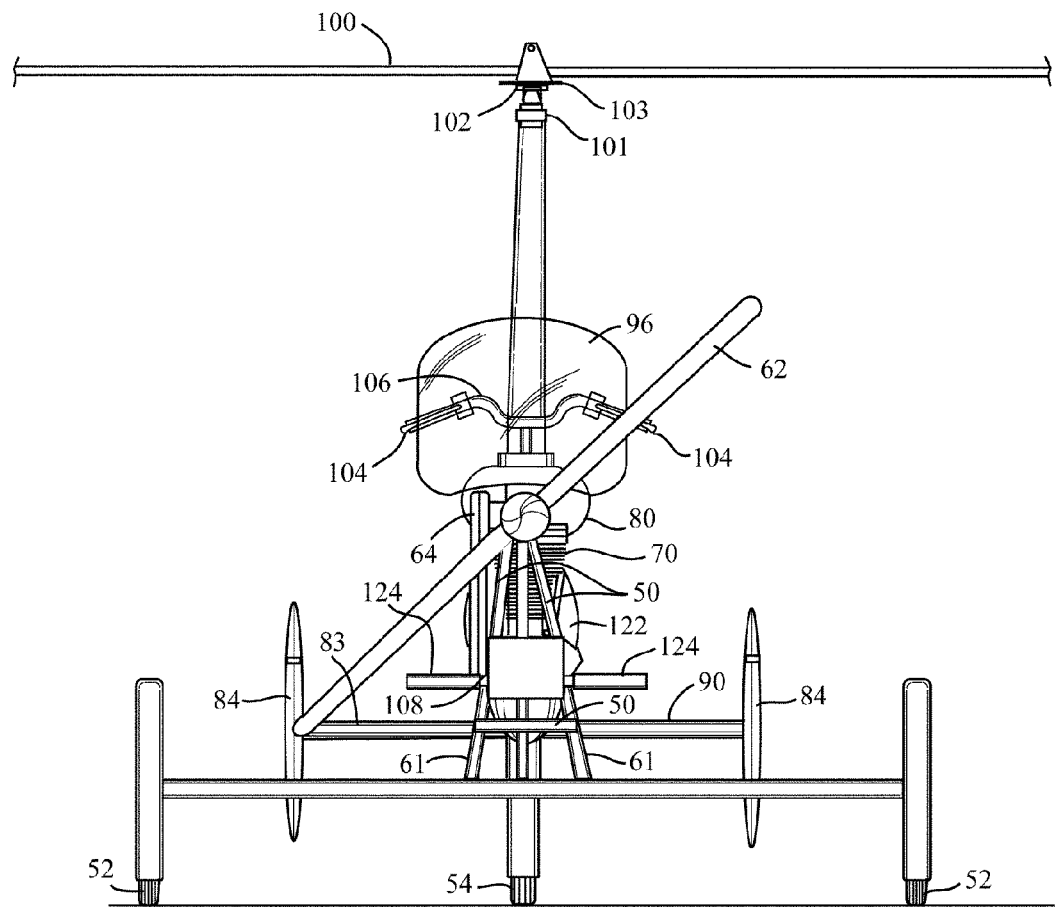
FIG. 4 is a front view of the motorcycle rider autogyro.
Figure 5:
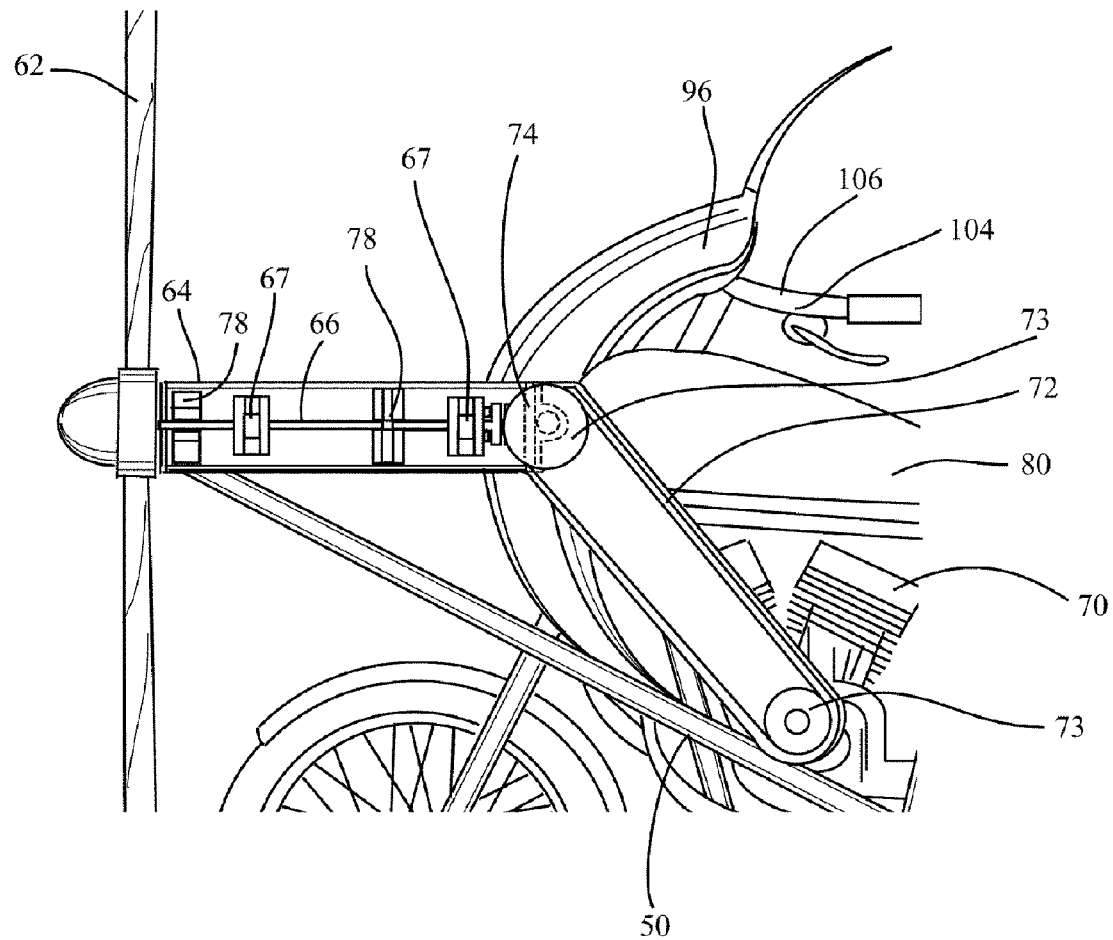
FIG. 5 shows a cut-away detail view the motorcycle rider autogyro propeller drive system used in an embodiment of the motorcycle rider autogyro.

FIGS. 1, 3, 4, and 5 show the principle parts of the propeller drive system that connects the engine to the propeller. The drive system (64) connects to the V-twin type motorcycle engine (70). Rotational power from the engine is transmitted to the propeller by this drive system (64). The drive system takes the rotation of the engine, transmits it to a transmission (74), which reduces the rotational speed and rotates the propeller (62). FIG. 5 shows a cut-away view of an embodiment of the drive system using drive belt pulleys (73) and a drive belt (72), which transmits power from the engine (70) to the right-angle gear transmission (74). Other embodiments may use drive components different from a belt (example, a chain and sprockets). The engine crankshaft axis of rotation is perpendicular to the frame front-to-rear axis, its output shaft to one side of the aircraft. Just forward of the simulated fuel tank (80) is the right-angle gear transmission (74). This places the centerline of the transmission output shaft near the center of gravity of the aircraft, on the same axis as the propeller. The transmission input shaft is perpendicular to the frame front-to-rear axis, to the same side of the aircraft as the engine output. This allows for alignment of the drive system. The sizes of the drive pulleys may be varied to modify the rotational speed of the transmission input as compared to the engine. This allows accommodating different propeller and engine performance characteristics. In FIG. 5 the transmission pulley is shown larger than the engine pulley to provide a reduction in rotational speed from the engine to the transmission. Inside the transmission, the input shaft connects to a drive pinion gear which mates with a larger output bevel gear connected to the output shaft. This provides a further reduction in rotational speed for driving the propeller drive shaft (66) at a lower rotation speed than the engine. The drive shaft is supported in the radial and axial directions by bearings (78). The drive shaft may also have flexible joints (67), which reduce vibration forces. The drive shaft connects to the propeller hub to rotate the propeller. In FIGS. 1 through 4, a shortened propeller drive shaft housing is shown. This houses a shorter propeller drive shaft and a combination thrust and radial bearing, as is known to those familiar with the art.

Many components of the propeller drive system are motorcycle or automotive parts, presently used in motorcycle or automotive applications, and therefore are readily available at reasonable cost. The engine exhaust piping is located on the opposite side of the aircraft from the drive belt as shown, but not numbered, on FIG. 2. The exhaust piping is similar to that commonly found on motorcycles.

The motorcycle-type front wheels (52) and rear wheel (54) support the aircraft on the ground in a reversed tricycle arrangement, as shown in FIGS. 3 and 4. The front wheels are used to steer the vehicle on the ground. These wheels are connected to a tie rod that is moved by the handlebars (106) through the control column (108) and a common steering gear that is not shown.

Together the handlebar (106) and control column (108) are a control assembly (104) that provides control of the aircraft both on the ground and in flight. The handlebar is similar in appearance and operation to a motorcycle handlebar, with a left and right side equipped with grips on the ends for the hands of the rider. The rider moving the handlebar left or right on the axis of the control column moves the front wheels left and right from the central position, which is the aircraft front-to-rear axis, in the same manner as an automobile. The motion of the handlebar to turn left and right is spring loaded, that is the handlebars, and the front wheel, return to the central position unless the rider applies turning torque.

The rotating wing or rotor blade assembly (100) provides the lift to support the aircraft in flight, and therefore supports the aircraft in the air. The rotor blades rotate by the airflow caused by the forward, and/or downward, motion of the aircraft. The blades are mounted to an adjustable rotor head (102) connected to the frame at a rearward angle to the vertical axis of the aircraft (perpendicular to the front-to-rear axis), as shown on FIGS. 1 and 2. The rearward angle provides air flow to turn the rotor, and therefore provide lift, when the aircraft is moving in the forward direction, or when moving forward and ascending. Rotor blade control linkage shafts (112) connect the angularly adjustable rotor head (102) to the control column to control the front-to-rear and side-to-side angle of rotation of the rotor blades with respect to the frame.

A rotor pre-rotation device (101) consisting of a motor and a pre-rotation device drive mechanism (103) (example, drive gear, belt or chain) is provided near the rotor head to turn the rotor prior to take-off of the aircraft. The device starts the rotation of the rotor blade so flying speed may be reached sooner than would be the case in starting takeoff with the rotor stationary. The motor engages the drive mechanism when energized to turn the rotor and disengages when the rider turns the motor off, or the rotor rotational speed reaches a preset value. This pre-rotation reduces the runway needed for takeoff.

Details of the rotor blade control linkage are shown in FIG. 6. The control linkage provides a connection between the control assembly (104) tilt motion and the front-to-rear and side-to-side motion of the rotor mount using both the axial and torsional motion of a single horizontal shaft and a single vertical shaft. This provides control motion of the rotor mount axis of rotation in two directions, front-to-rear and left-to-right, using a single control mechanism. The linkage is a series of two bearing (118) mounted single shafts (112), one horizontal, one vertical, joined by ball joints (114) and spherical rod ends (116). The shafts may be constructed of lightweight tubing. The linkage operates similarly to the transmission control linkages commonly used on standard transmission automobiles. The control column (108) transmits handlebar rotation to the front wheels. It is connected to the front wheels and cable connections through a gimbal mount (110) containing a spherical bearing. The gimbal allows it not only to rotate, but also allows limited transverse motion, or tilting, in the front-to-rear direction and the side-to-side direction. The handlebar (106) and the control column (108), as shown in FIGS. 1 and 2, are a control assembly (104) with this tilting motion. The tilting motions are transmitted to the rotor head, as shown in FIG. 6 by a ball joint (114) on the control linkage (112). Tilting the handlebar control assembly front-to-rear moves the horizontal control linkage shaft front-to-rear and this motion is translated into rotational motion of the vertical control linkage shaft by a ball joint (114) connected between the 2 shafts. Tilting the handlebar control assembly in side-to-side motion moves the horizontal control linkage shaft in a rotation, clockwise or counter-clockwise, depending on the direction of the side-to-side motion. This motion is translated into up-and-down motion of the vertical control linkage shaft by a spherical rod end (116) connected between the two shafts. The motion of the vertical shaft is transmitted to the rotor mount (102) by a spherical rod end (116) and results in the rotor mount (102) tilting in the same direction as the control assembly (104).

The rudder and horizontal stabilizer assembly (83) is at the rear of the aircraft, as shown in FIGS. 1 through 4. It provides stability to the aircraft attitude in flight, and the rudder is adjustable to assist in steering on the ground. The rudder (84) controls the yaw or side-to-side attitude of the aircraft. If the aircraft is moving forward but with the front-to-rear axis of the aircraft at an angle to the direction of motion, as may occur with side winds, this yaw angle may be corrected by appropriately positioning the rudder. The horizontal stabilizer (90) assists in stabilizing the pitch angle of the aircraft. The movable surfaces (91) on the horizontal stabilizer assist in stabilizing the aircraft pitch angle in the event an unstable situation occurs.

The control assembly (104) in FIGS. 1 and 2 has controls for the aircraft in flight and on the ground. The handlebar (106) incorporates the engine throttle control built into a handgrip as it is on a motorcycle. Other controls on the handlebar control assembly for use on the ground are for the front wheel brakes and the front wheel steering. In flight, the handlebar control assembly controls the rotor front-to-rear angle, the side-to-side angle, and the engine throttle on the handlebar controls the propeller rotational speed.

Additional Embodiments

Figure 7:
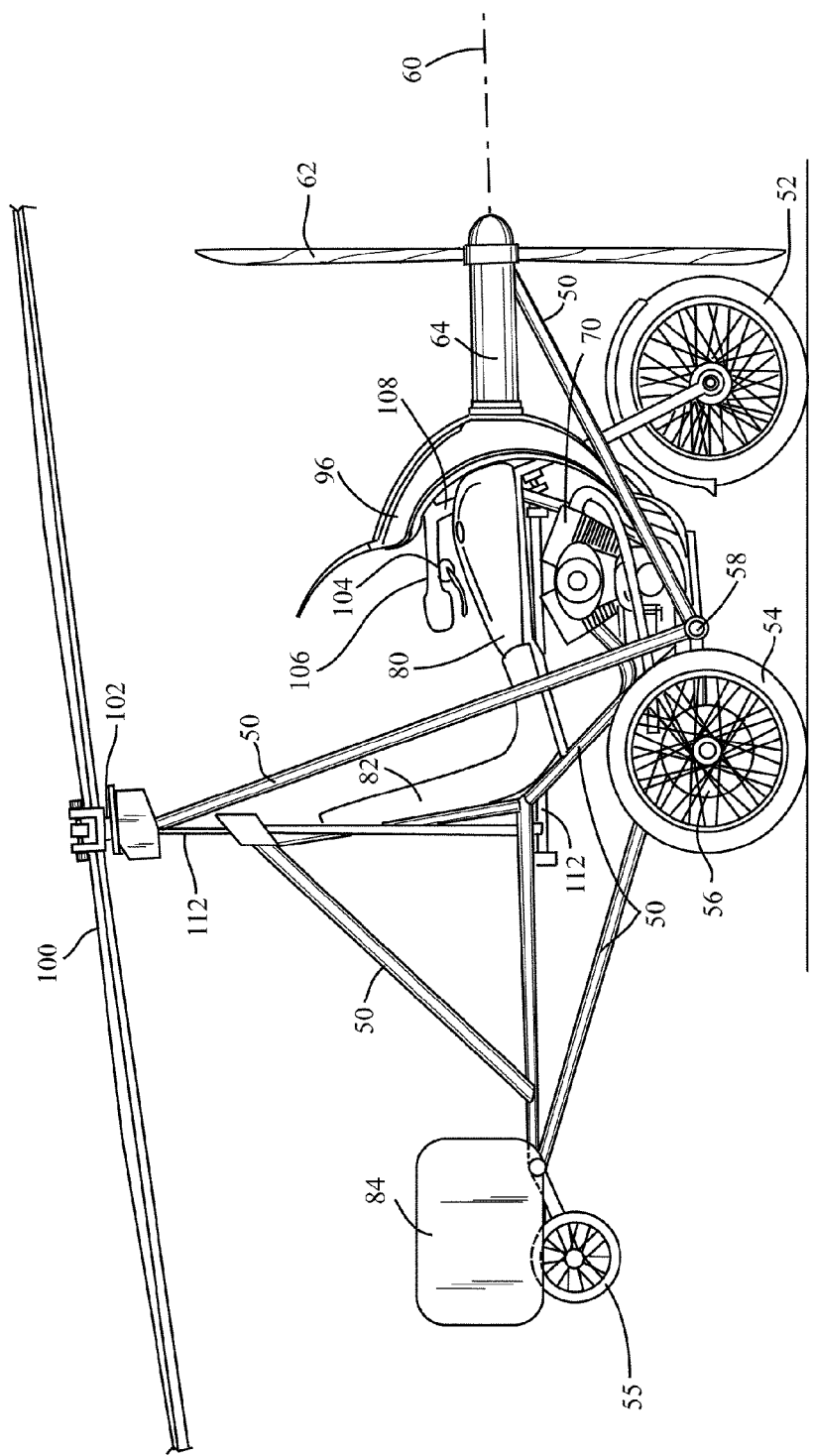
FIG. 7 is a right side view of a second embodiment of the motorcycle rider autogyro.
Figure 8:
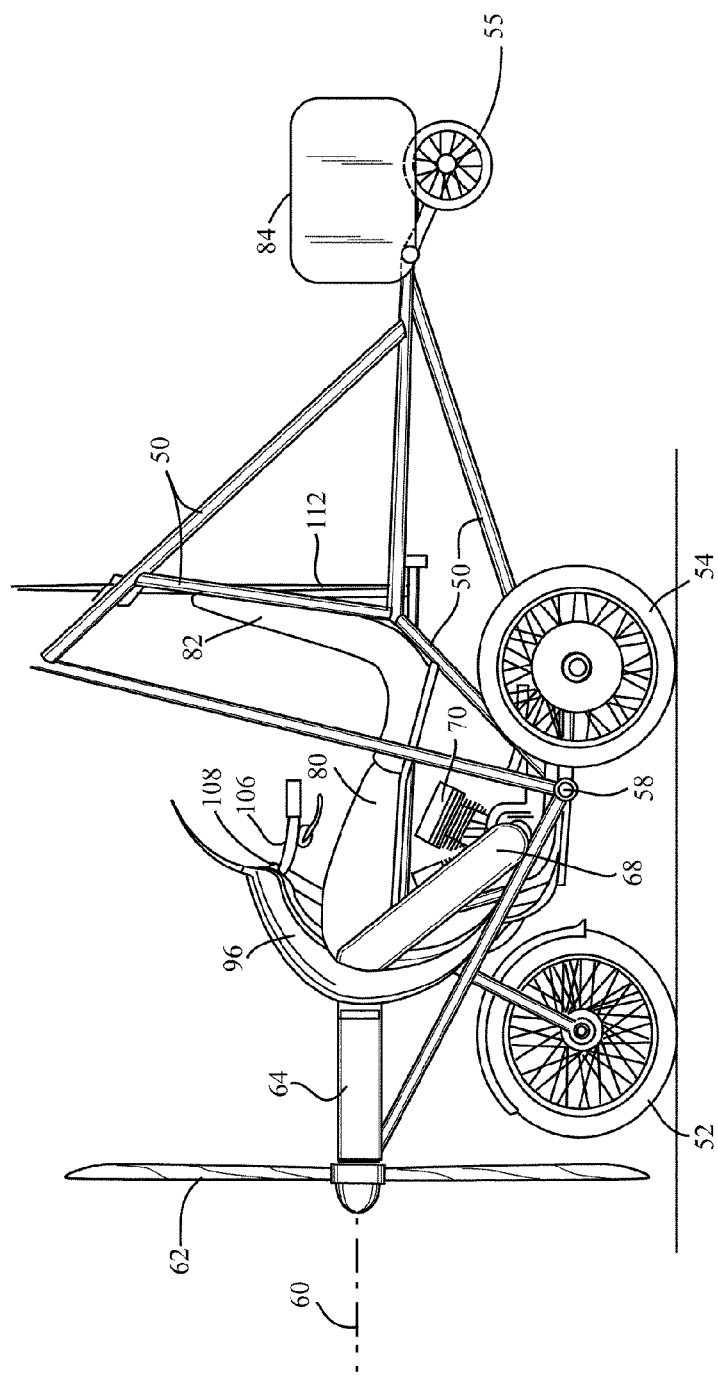
FIG. 8 is a left side view of a second embodiment of the motorcycle rider autogyro.
Figure 9:
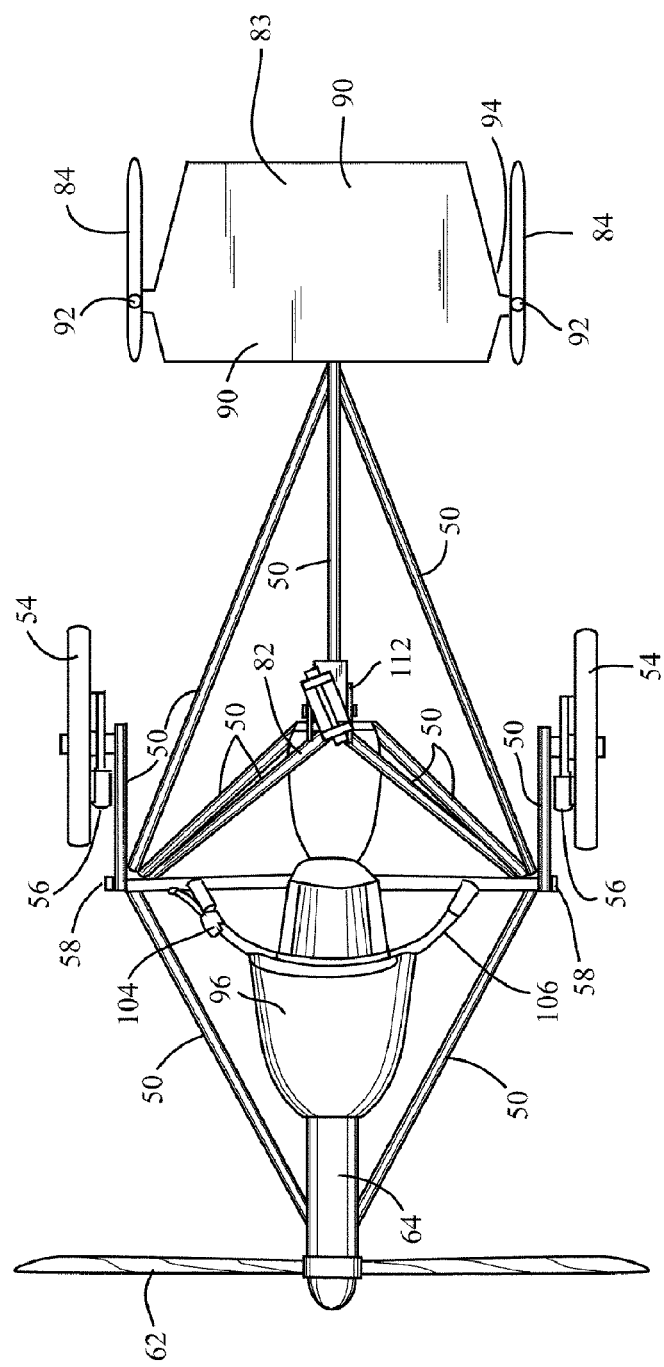
FIG. 9 is a top view of a second embodiment of the motorcycle rider autogyro.
Figure 10:
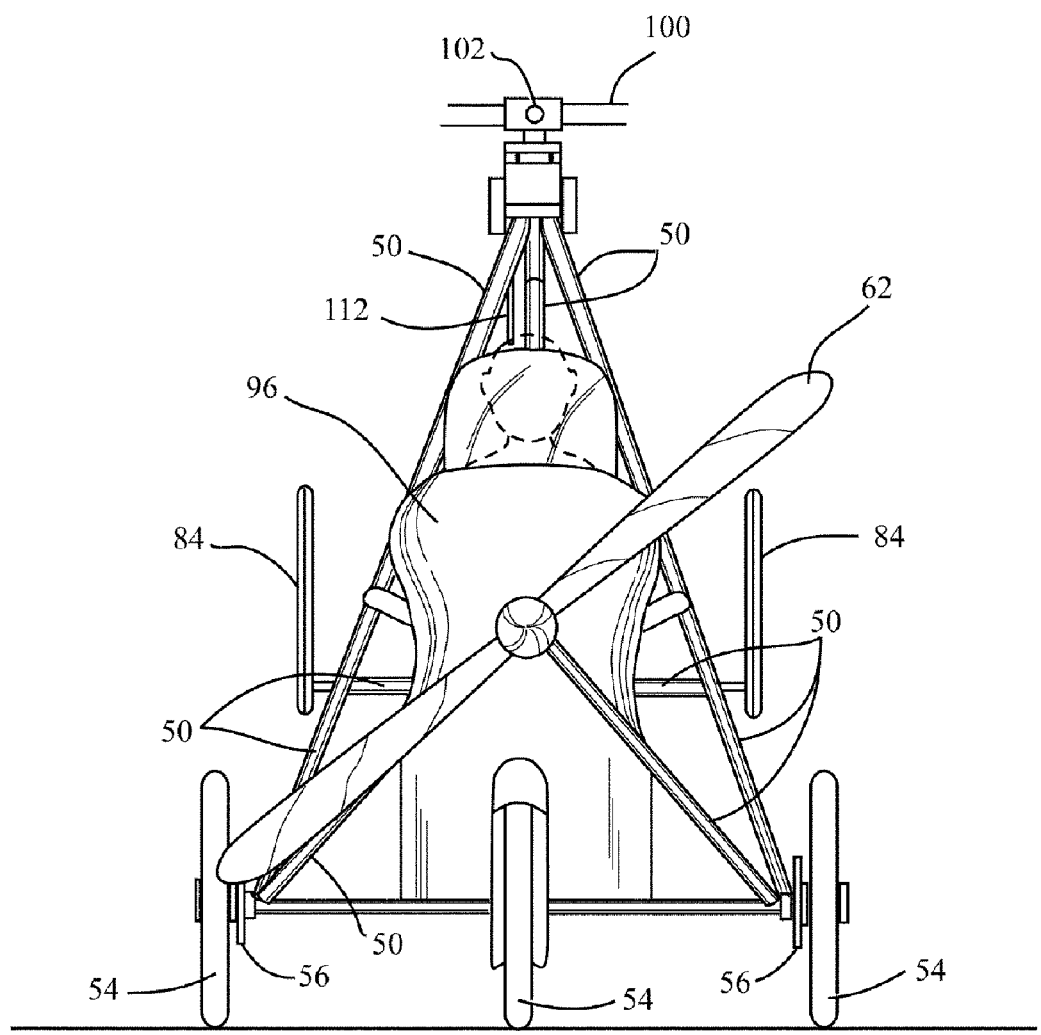
FIG. 10 is a front view of a second embodiment of the motorcycle rider autogyro.

Another embodiment of the motorcycle rider autogiro is shown in FIGS. 7 through 10. FIG. 7 is a right side view showing the arrangement of the aircraft. FIG. 8 shows the left side view, FIG. 9 the top view, and FIG. 10 the front view. The straddle-type seat (82) is centrally located on the frame (50) behind the simulated fuel tank (80), windshield (96), and propeller (62). The seat is above and slightly behind the engine (70). The rotating wing, also called the rotor blade assembly (100), is supported above the seat. Behind the seat is the rudder and horizontal stabilizer assembly (83). The frame is supported on the ground on 3 lightweight motorcycle-like spoked wheels with rubber tires, one front (52), and two rear (54), which support the frame, the rider, and all the aircraft components attached to the frame on a ground surface. A fourth wheel is below the rudder and horizontal stabilizer assembly to support the assembly and prevent damage during takeoff and landing. In FIGS. 8 and 9 the frame front-to-rear axis (60) is shown. This is the axis of normal motion of the aircraft, which is in the forward direction. The V-twin type motorcycle engine (70) is located below the straddle-type seat and simulated fuel tank at the lower portion of the frame.

The frame is constructed of lightweight metal tubing and provides support and a connection, either welded or using fasteners, for the aircraft components shown in FIGS. 8 and 9. These components include the propeller drive shaft housing (64), which supports the propeller (62), the windshield (96), The control column (108), which connects the front wheel (52), and the handlebar (104). The simulated fuel tank (80), and straddle-type seat (82), shown in FIGS. 1 and 2 connect to frame members that also support the lower portion of the rotor angle control assembly (112), shown in FIG. 6, and partially shown in FIGS. 8 and 9.

The rear wheels (54) are the aircraft main landing gear and are suspended from the frame by a torsion bar (58). The torsion bar reduces the shock of irregularities in the ground surface that the aircraft is moving on and also absorbs the shock of landing on the ground after flight. The rear wheels also have disc brakes (56) used to slow and stop the aircraft when on the ground. These are controlled by a lever on the handlebar, similar to the control of a motorcycle's rear brake.

The rudder and horizontal stabilizer assembly (83) is connected to several frame members at the rear end of the frame, some of which also support the rotor assembly as shown on FIGS. 7, 8, and 9. The two vertical members of the rudder and horizontal stabilizer assembly, shown in FIG. 9, are the rudders (84). The horizontal stabilizer (90) is the horizontal member, also shown in FIGS. 9 and 10. This assembly has movable rudder surfaces that aid in controlling the yaw of the aircraft in flight, and the direction of the aircraft on takeoff and landing. Control of the rudder is by cables connected to foot pedal controls that are common and well know to those familiar with aircraft.

The motorcycle rider autogyro as previously described employs many components conventional to autogyros and motorcycles and will be well understood by persons ordinarily skilled in the relevant aircraft and motorcycle arts without more detailed explanation. Persons skilled in the art will appreciate the motorcycle rider autogyro may have alternate configurations and additional accessories, such as accommodations for a passenger rider, alternate motorcycle engines, various configurations of teardrop-shaped simulated gas tanks, while retaining the novel features described in the claims.

Operation

Operation of the motorcycle rider autogyro begins with the rider straddling the seat, placing the feet on the crossbar, and checking the fuel level. The controls for the rotor angle are then checked by placing the hands on the handlebar grips located on the ends of the handlebar and tilting the handlebar front-to-rear and side-to-side while observing the motion of the rotor head. The front wheel motion is then checked by moving the handlebars left and right while observing the motion of the front wheel(s). The rider then checks the rudder motion by moving the rudder control pedals and observing the rudder angle motion. The rider assures the propeller is clear, and applies the brakes with the brake control lever attached to the handlebar in order to start the engine. The right handgrip is twisted to check operation of the engine throttle, the ignition key is inserted and turned, and the engine is started. Starting the engine causes the propeller to rotate tending to move the aircraft forward. The propeller, located at the front of the aircraft, moves air toward the rear of the aircraft. The brakes restrain the aircraft motion. Releasing the brake when the path is clear allows the autogyro to move or taxi on the wheels supporting the aircraft on the ground. The rider retains the hands on the grips and steers the autogyro by turning the handlebar.

Takeoff requires a free and clear runway. The rider initiates rotation of the rotor by initiating the rotor pre-rotation device to start the rotor turning. Then by rotating the right handlebar grip, the rider opens the throttle fully and pulls to the rear on the handlebar placing the rotor angle furthest towards the rear of the aircraft. The aircraft is freely allowed to gain speed as it moves down the runway. The rider sits straddling the engine and gas tank and steers the aircraft by the handlebar. The front wheel(s) turn the aircraft, but as speed increases, motion of the rudder will also influence the direction of the aircraft. The forward motion causes the rotor blades to rotate faster as the aircraft gains speed, increasing drag. This gives maximum rotation of the rotor, but makes it more difficult to accelerate due to the increased drag. The rider eases forward on the handlebar as rotor speed increases to allow increased forward speed. When the aircraft is moving at a sufficient speed, the rotation of the rotor blades will reach flying speed and the rotor will provide enough lift to take the aircraft airborne.

In the air, the rider straddles the engine and holds the handlebar grips. Tilting the handlebars left or right controls flight direction, which adjusts the rotor mount angle to the proper side. This causes the aircraft to roll to the left or right. The handlebar is returned to the central position for forward flight. Ascent and decent are controlled by adjusting the engine throttle using the handgrip to change the propeller rotational speed. Increasing the speed increases airflow to the rotor, increasing lift and causing the aircraft to ascend. The forward speed of the aircraft is controlled by adjusting the front-to-rear angle of the rotor. Tilting the handlebar forward causes the rotor angle of attack to shift to the front of the aircraft. The drag on the aircraft forward motion by the rotor is decreased, and the aircraft speed increases. Speed is decreased by tilting the handlebar rearward, shifting the rotor angle of attack to the rear of the aircraft. This increases the drag and the aircraft speed decreases.

Landing the aircraft is accomplished by reducing engine speed to descend. The rider tilts the handlebar rearward, reducing the aircraft forward speed, as the runway is approached. The runway is approached and a soft landing is accomplished by reducing engine power and a flare, that is tilting to the rear fully on the handlebars to move the rotor angle all the way to the rear. This causes the aircraft to nose up, reducing the rate of descent as the aircraft touches down on the two main gear wheels. These wheels have a suspension to the frame and they and the other wheel(s) support the aircraft frame. A soft landing may be accomplished with the engine at minimum power, or even shut down.

The motorcycle rider autogyro may also be used as a vehicle on a ground surface by first fastening the rotor blades to the rear, between the rudders. Similarly it may be used as a watercraft by attaching floats to the wheels.

What is claimed is:

1. An aircraft comprising:
    a. a propeller arranged to rotate and provide forward propulsion of the aircraft;
    b. a rotating wing arranged to freely rotate with forward motion of the aircraft and a rotor head adjustably connecting the rotating wing to the aircraft such that the rotating wing axis of rotation in the aircraft front-to-rear and side-to-side directions may be adjusted;

c. a rudder and horizontal stabilizer assembly, the rudder adjustably arranged to provide airborne aircraft yaw control and the horizontal stabilizer arranged to provide airborne aircraft pitch stability;

d. an engine and a propeller drive assembly arranged such that the engine rotation is reduced in rotational speed and transmitted to rotate the propeller;

e. one or more front wheels and one or more rear wheels arranged on a front-to-rear axis of the aircraft such that the aircraft is movably supported on a surface wherein the aircraft on the ground may accelerate along the ground surface with forward motion from the propeller rotation until the aircraft forward speed is sufficient that the rotating wing provides sufficient lift force such that the aircraft becomes airborne;

f. a control column with a gimbal mount arranged such that the control column rotates on a rotational axis and tilts on front-to-rear and side-to-side transverse axes, the control column movably connected to one or more wheels, wherein rotating the control column turns the one or more wheels to an angle to the aircraft front-to-rear axis, and the control column movably connected to the rotor head wherein moving the control column in the front-to-rear transverse axis adjusts the rotating wing axis of rotation in the front-to-rear transverse axis, and moving the control column in the side-to-side transverse axis adjusts the rotating wing axis of rotation in the side-to-side transverse axis.

2. The aircraft of claim 1 further comprising the connection of the control column and the rotor head is a series of two bearing mounted single shafts, one horizontal, one vertical, connected between the control column and rotor head and joined by ball joints and spherical rod ends arranged such that tilting the control column in the front-to-rear axis moves the horizontal shaft front-to-rear and this motion is translated into rotational motion of the vertical shaft such that the rotor head is tilted in the same direction, and tilting the control column in the side-to-side axis moves the horizontal shaft in a rotation, and this motion is translated into up-and-down motion of the vertical shaft such that the rotor head is tilted in the same direction.

3. The aircraft of claim 1 further comprising a handlebar with a left end and a right end connected to the control column, a motorcycle engine, a windshield, a teardrop-shaped simulated fuel tank and a straddle-type seat arranged such that a rider may face the windshield with the handlebar ends gripped by the hands and the upper leg straddling the tank and the lower leg straddling the engine.

4. The aircraft of claim 2 further comprising a handlebar with a left end and a right end connected to the control column, a motorcycle engine, a windshield, a teardrop-shaped simulated fuel tank and a straddle-type seat arranged such that a rider may face the windshield with the handlebar ends gripped by the hands and the upper leg straddling the tank and the lower leg straddling the engine.

5. A motorcycle rider autogyro aircraft comprising:

a. a frame, a propeller, a propeller drive assembly, an engine, a simulated fuel tank, a straddle-type seat, a rotor blade assembly, a rudder and horizontal stabilizer assembly, and a handlebar control assembly;

b. the frame arranged with a front end and a rear end, and a front-to-rear axis, and with support and connection means for one or more steerable and rotatable front wheels and one or more rotatable rear wheels, the wheels arranged to rotate substantially on the frame front-to-rear axis and to movably support the frame on a surface;

c. the propeller rotatably connected to the frame and connected to the drive assembly such that the propeller is rotated by the propeller drive assembly;

d. the propeller drive assembly connected to the engine and with means for transferring the engine rotational energy to the propeller;

e. the simulated fuel tank arranged above the engine with a shape substantially as a teardrop with a large end and a small end, the large end arranged toward the frame front end;

f. the seat arranged with a front end and a rear end such that the seat front end is arranged adjacent to the simulated fuel tank small end;

g. the rotor blade assembly adjustably arranged on a rotor head to rotate with a rotor blade axis of rotation located above the frame and at an angle from the vertical towards the rear of the frame;

h. the rudder and the horizontal stabilizer assembly adjustably arranged to the rear of the seat rear end with horizontal stabilizer surfaces and vertical rudder surfaces; and i. the handlebar control assembly with a control column and a handlebar with a left end and a right end such that a handlebar central area between the left and right ends is attached to the control column such that a rider holding the handlebar ends may turn the handlebar wherein the control column is turned by the handlebar motion, the control column arranged for adjusting the angle of the one or more front wheels with respect to the frame front-to-rear axis to steer the aircraft on the ground, and the control column tilts on the front-to-rear and side-to-side transverse axes, thereby adjusting the rotor blade assembly axis of rotation wherein the airborne aircraft speed may be changed by adjusting the front-to-rear transverse axis, and the airborne aircraft may be steered by adjusting the side-to-side column transverse axis wherein the rider may control the aircraft on the ground and when airborne facing the handlebar with the handlebar ends gripped by the hands and the upper leg straddling the tank and the lower leg straddling the engine.

6. The motorcycle rider autogyro aircraft of claim 5 wherein the engine is arranged with a rotational output perpendicular to the frame front-to-rear axis such that the means for transferring the engine rotational energy to the propeller comprises a drive system, a right-angle gear transmission, and a drive shaft arranged such that the engine rotational energy is transmitted to the transmission on a rotational axis perpendicular to the frame front-to-rear axis by the drive system, and from the transmission to the propeller by the drive shaft on a rotational axis on the frame front-to-rear axis.

7. The motorcycle rider autogyro aircraft of claim 6 wherein the engine is a motorcycle engine.

8. A method of manufacturing an autogyro aircraft comprising:

a. fabricating an aircraft frame with a front end and a rear end, a top and a bottom, and a left side and a right side, and one or more front wheels and one or more rear wheels, such that the frame is supported on the wheels when on the ground;

b. installing a motorcycle engine on the frame with an axis of rotation perpendicular and to a side of the frame front and rear axis;

c. installing a propeller on the frame front end with an axis of rotation parallel to the frame front-to-rear axis;

d. connecting the engine to the propeller such that the engine drives the propeller;

e. supporting a freely rotating rotor blade assembly on the frame top such that the rotor provides lift and supports the aircraft in flight, and such that the rotor axis of rotation is substantially at an angle toward the rear end of the perpendicular to the frame front-to-rear axis, and is angularly adjustable in a front-to-rear direction and in a side-to-side direction;

f. installing a rudder and horizontal stabilizer assembly on the frame rear end;

g. connecting a control assembly including a handlebar and a control column to the wheels such that turning the handlebar steers the aircraft on the ground;

h. attaching a simulated fuel tank arranged in a teardrop shape on the frame, the large end of the teardrop shape arranged toward the propeller;

i. supporting a straddle-type seat behind the simulated fuel tank arranged such that a seat occupant may face the frame front end and grip the handlebar by the hands and position the upper legs to straddle the tank and the lower legs to straddle the engine; and j. connecting the control assembly such that the seat occupant tilting the handle bar toward the front, toward the rear, to the left side, or to the right side tilts the rotor axis of rotation in the same direction as the handlebar such that the control assembly may be used to control the aircraft in flight.

* * * * *